Dec. 20, 1960 M. A. J. J. ASSIE 2,965,378

GRAMOPHONE PICK-UPS

Filed July 7, 1958

Inventor
M. A. J. J. Assie
By Glascock Downing & Seebold
Attys.

2,965,378

GRAMOPHONE PICK-UPS

Marcel Amédée Jean Joseph Assie, Paris, France, assignor to Les Industries Musicales et Electriques Pathe Marconi, Paris, France, a company of France Filed July 7, 1958, Ser. No. 747,084
Claims priority, application France July 16, 1957
7 Claims. (Cl. 274—37)

Figures 1, 2:
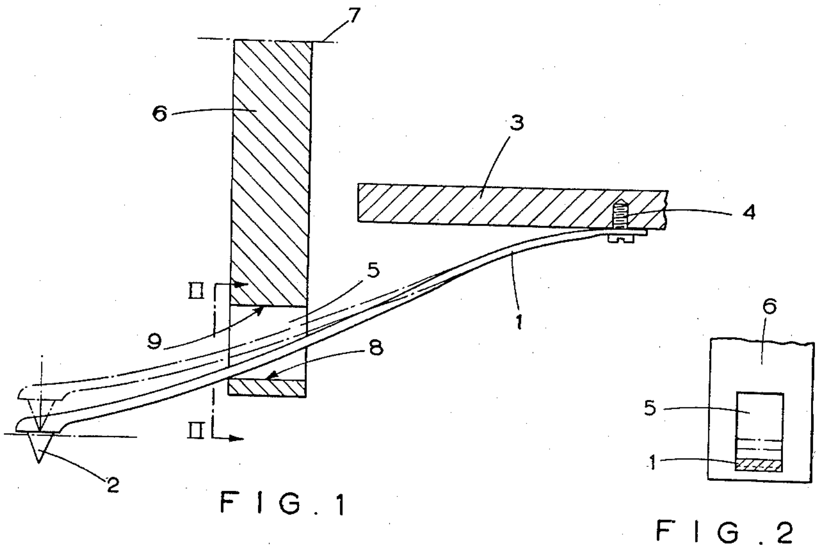

This invention relates to gramophone pick ups of the kind comprising a stylus carrying arm mounted on the pick-up and which is arranged to transmit vibrations of the stylus to the transducing means of the pick-up via a movable element, and means are provided for coupling the stylus carrying arm to the movable element.

The object of the present invention is to provide an improved gramophone pick-up of the kind specified.

According to the invention there is provided a gramophone pick-up comprising a stylus arm, transducing means, a movable element coupled to said transducing means and a passageway through said movable element, said arm passing through said passageway in which in a first direction the cross-sectional dimension of the portion of said arm within said passageway is less than the dimension of said passageway in said first direction, and in a second direction, intersecting said first direction, the cross-sectional dimension of said portion of said arm is substantially equal to the dimension of said passageway in said second direction, so that said arm can move in either sense in said first direction without imparting movement to said transducing means in said first direction, but movement of said arm in either sense in said second direction is imparted to said transducing means. Preferably means are provided subjecting said stylus carrying arm to a resilient action urging said arm away from said pick-up. Preferably also said passageway is in the form of a slot and said resilient action is such that said arm resides in equilibrium substantially centrally in said passageway or slot whilst said pick-up is being employed to reproduce signals in a grooved sound record whereby movements of said arm in the directions of the major length of said slot are not substantially transmitted to said element.

It has hitherto been proposed to accommodate a stylus carrying arm in a groove (such as an inverted V-shaped recess) in a movable element coupled to the transducing means of a pick-up. With this arrangement desired movements of the arm in a direction, for example in the case of a laterally modulated grooved record in the lateral directions are usually transmitted to said element but in addition undesired movement in one direction intersecting said lateral direction may also be so transmitted with the disadvantage that said undesired movement may be applied to the transducing system.

It will be appreciated that this disadvantage is substantially overcome by the provision of a passageway in said element which is sufficiently wide in said direction intersecting said lateral direction to enable said arm to be displaced in this direction without transmitting such displacements to said member.

When the pick-up is intended to be employed to reproduce signals in a grooved sound record which is laterally modulated it will be appreciated that it is required to transmit lateral movements of the stylus carrying arm to the transducing means, but not to transmit vertical movements of said arm. For this reason the element coupled to said transducing means is arranged with the passageway when in the form of a slot, with its longtiudinal axis substantially perpendicular to a record and its transverse axis substantially parallel thereto. Preferably the surfaces of the aperture through the medium of which the desired movements of said arm are transmitted to the transducing means exert a small pressure on the stylus carrying arm so that displacements thereof in the desired direction are accurately transmitted to said element.

Figures 3, 4:
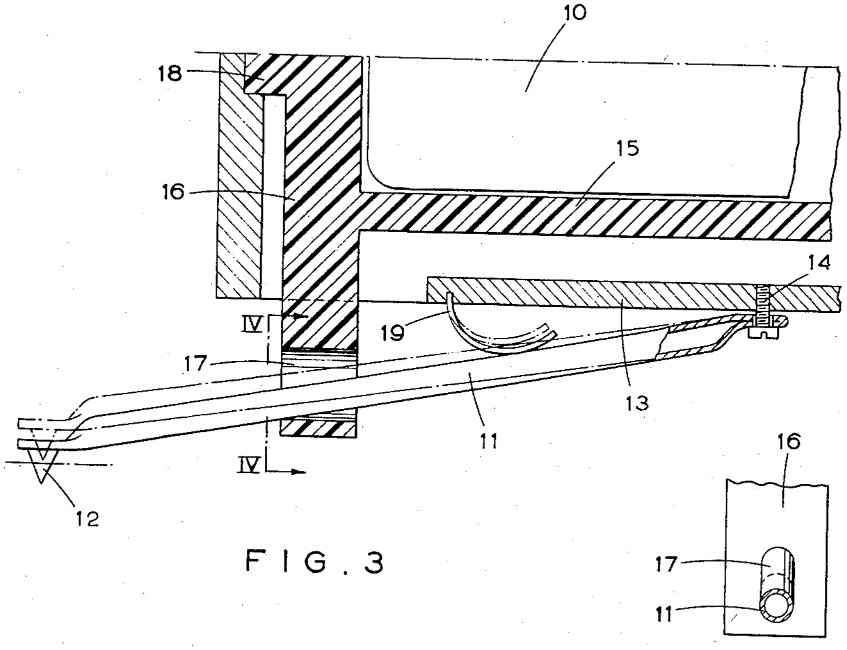

In order that the present invention may be clearly understood and readily carried into effect, it will now be more fully described with reference to the accompanying drawings, in which:

Figure 1 shows a gramophone pick-up according to one embodiment of the invention, Figure 2 is a cross section of a portion of Figure 1 along II—II, Figure 3 shows a gramophone pick-up according to another embodiment of the invention, and Figure 4 is a cross section of a portion of Figure 3 along IV—IV.

Referring to Figure 1 the stylus carrying arm is in the form of an inherently resilient strip such as a leaf spring curved as shown and carrying at one end a reproducing stylus 2. In the embodiment shown the arm 1 is compliant in the plane of the paper but substantially rigid in a direction normal thereto. The arm 1 near the other end thereof is mounted on the casing 3 of transducing means (not shown) by means of a screw 4 such as to permit pivotal movement of said arm 1 about said screw 4. The transducing means may comprise a piezo-electric element or may be of any other suitable kind capable of converting a mechanical displacement into an electrical signal, such as one having a movable armature or coil. The arm 1 projects through a passageway 5 in an element 6 shown in Figures 1 and 2, which element 6 is pivotally mounted about an axis 7. In the present embodiment the pick-up is arranged to reproduce signals from a grooved sound record which is laterally modulated in which case the axis 7 is arranged to be parallel to said record. The element 6 is coupled to the transducing means, so that pivotal movement of said element 6 is applied to said means to cause the generation of representative electrical signals.

The passageway 5 is in the form of a rectangular slot as shown in Figure 2 the width of said slot being substantially equal to the width of the arm 1 so that movements of said arm 1 in the directions of said width which result from lateral displacements of the stylus 2 are transmitted to the element 6 to cause said element 6 to pivot about the axis 7. The length of the slot, however, is arranged to be considerably larger than the thickness of the arm 1 so that said arm 1 can be moved vertically without transmitting such vertical movements to the element 6. Thus, as can be seen from Figures 1 and 2, in a first direction, namely the vertical direction, the cross-sectional dimension of the arm 1 where it passes through the slot 5 is less than the dimension of said slot 5 in said vertical direction, whilst in a second direction, namely the horizontal direction, the cross-sectional dimension of the arm 1 is substantially equal to the dimension of the slot 5 in said horizontal direction. The curvature or inherent resilience of the arm 1 is such as to cause said arm 1 to be in contact with the lower bounding wall 8 of the passageway 5 when the stylus 2 is not in engagement with a record as shown in full lines in Figures 1 and 2. When, however, the stylus 2 is in engagement with a grooved sound record the arm is arranged to reside in equilibrium within the passageway 5 substantially midway between the lower bounding wall 8 and upper bounding wall 9 thereof as shown dotted in Figures 1 and 2, since it is arranged that in this position the resilient forces of the arm 1 balance the weight of the pick-up.

In operation of the pick-up of Figures 1 and 2 when the stylus 2 is in engagement with a laterally modulated grooved sound record and the arm 1 resides substantially midway between the bounding walls 8 and 9 any vertical movements of the stylus 2 cause the arm 1 to move vertically within the passageway 5 and are not substantially transmitted to the element 6 provided said movements are not sufficiently great to cause said arm 1 to engage the bounding wall 8 or 9. Thus such vertical movements are not substantially transmitted to the transducing means. Lateral displacements of the stylus 2 are however transmitted to the element 6 as described, and by pivotal movement of said element 6 about the axis 7 said displacements are transmitted to the transducing means.

Figures 3 and 4 illustrate another embodiment of the invention in which the transducing means comprises a piezo-electric element 10 of the so-called bender type, which element may for example be of a Seignette salt. In the present embodiment the stylus carrying arm 11 is in the form of a rigid tube of Duralumin (registered trademark) for example, at one end of which a reproducing stylus 12 is mounted, and the other end of which is loosely mounted on a casing 13 of the pick-up by means of a screw 14 such as to enable pivotal movement of said arm 11 about said screw 14. The casing 13 houses an envelope 15 of a resilient material such as polyethylene which encloses the piezo-electric element 10 and is integral with an element 16 having a passageway 17 therethrough accommodating the arm 11. The pick-up is arranged to reproduce signals in a laterally modulated grooved sound record and the element 16 is pivotal about a projection 18 thereof secured to the casing 13 and is designed to be rigid in said lateral direction.

The casing 13 is such as to transmit movements to and from the piezo-electric element 10 so that pivotal movement of the element 16 is transmitted to said piezo-electric element 10. In the present embodiment the passageway 17 is in the form of a slot having its longer width in the vertical direction and has rounded ends as shown in the drawings. A spring arm 19 is secured to the casing 13 at one end and is arranged to press against the arm 11 so as to subject said arm 11 to a resilient action urging said arm 11 away from the casing 13 and normally into contact with the lower bounding wall of the passageway 17 as shown by the full lines in Figures 3 and 4. It is arranged that the width of the passageway 17 in the lateral direction in the absence of the arm 11 is slightly less than the width of said arm 11 so that the vertical bounding walls of said aperture exert a slight pressure on the arm 11. This is desirable in order to obtain accurate transmission of lateral displacements of said arm 11 to the element 16 and is such as not substantially to cause friction when the arm 11 is displaced in the vertical direction since the material of said element 16 is resilient as previously stated.

In operation of the pick-up of Figures 3 and 4 when the stylus 12 is in engagement with a grooved sound record the arm 11 is arranged to take up the position shown dotted so as to be substantially centrally arranged in the passageway 17 in which position the arm 11 is in equilibrium since the resilient action of the spring arm 19 on the arm 11 balances the weight of the pick-up. It will be appreciated that lateral displacements of the stylus 12 will be transmitted to the element 16 via the arm 11 whilst vertical displacements of said stylus 12 will not substantially be transmitted from the arm 11 to the element 16.

The invention has been described with reference to particular embodiments thereof but it will be understood that other embodiments thereof exist. For example the resilient action on the stylus carrying arm may be provided by the interposition of a member of flexible material other than a spring such as a rubber member for example between said arm and the transducer. Furthermore the principle of the invention can be applied with suitable modification of the disposition of the passageway relatively to the stylus carrying arm and the transducing means in reproducing signals in a grooved sound record modulated in a direction other than the lateral direction, for example with so-called hill and dale modulation.

What I claim is:

1. A gramophone pick-up comprising a stylus arm, transducing means, a movable element coupled to said transducing means and a passageway through said movable element, said arm passing through said passageway, in which in a first direction the cross-sectional dimension of the portion of said arm within said passageway is less than the dimension of said passageway in said first direction, and in a second direction, intersecting said first direction, the cross sectional dimension of said portion of said arm is substantially equal to the dimension of said passageway in said second direction, so that said arm can move in either sense in said first direction without imparting movement to said transducing means in said first direction, but movement of said arm in either sense in said second direction is imparted to said transducing means.

2. A gramophone pick-up comprising a stylus arm, transducing means, a movable element coupled to said transducing means and a passageway through said movable element, said arm passing through said passageway, in which said passageway is in the form of a slot and said arm is formed from a flat strip of material compliant in a first direction at right angles to its major surfaces and relatively rigid in a second direction which is in the direction of its width, and the width of said slot is in said first direction and the sides of said slot engage the edges of said strip, so that said arm can move in either sense in said first direction without imparting movement to said transducing means in said first direction, but movement of said arm in either sense in said second direction is imparted to said transducing means.

3. A gramophone pick-up comprising a stylus arm, transducing means, a movable element coupled to said transducing means and a passageway through said movable element, said arm passing through said passageway, in which in a first direction the cross-sectional dimension of the portion of said arm within said passageway is less than the dimension in said first direction, and in a second direction, intersecting first direction, the cross-sectional dimension of said portion of said arm is substantially equal to the dimension of said passageway in said second direction, so that said arm can move in either sense in said first direction without imparting movement to said transducing means in said first direction, but movement of said arm in either sense in said second direction is imparted to said transducing means, and means for resiliently mounting said stylus arm in said first direction such that said arm normally lies at one end of said passageway, and such that when a stylus carried by said arm is in engagement with a record the weight of the pick-up causes said arm to move in a position in said passageway intermediate the ends of said passageway.

4. A pick-up according to claim 1 wherein said passageway is in the form of a slot having its width in said second direction.

5. A pick-up according to claim 3 in which said means for resiliently mounting said stylus arm comprise resilient material forming said arm such that said arm is compliant in said first direction and relatively rigid in said second direction.

6. A pick-up according to claim 3 in which said means for resiliently mounting said stylus arm comprises resilient means mounted on the pick-up urging said arm to said one end of said passageway.

7. A pick-up according to claim 1 comprising resilient material forming said movable element and in which the width of said passageway in said second direction is such that the surfaces of said element defining said width exert a slight pressure on said stylus arm.

References Cited in the file of this patent

UNITED STATES PATENTS 2,601,988 Chorpening et al. ---------- July 1, 1952